US009226284B2

(12) United States Patent
Wu

(10) Patent No.: US 9,226,284 B2
(45) Date of Patent: Dec. 29, 2015

(54) METHOD OF BLIND DECODING OF CONTROL CHANNEL FOR A WIRELESS COMMUNICATION SYSTEM

(71) Applicant: HTC Corporation, Taoyuan County (TW)

(72) Inventor: Chih-Yao Wu, Taoyuan County (TW)

(73) Assignee: HTC Corporation, Taoyuan District, Taoyuan (TW)

( * ) Notice: Subject to any disclaimer, the term of this patent is extended or adjusted under 35 U.S.C. 154(b) by 172 days.

(21) Appl. No.: 13/721,074

(22) Filed: Dec. 20, 2012

(65) Prior Publication Data

US 2013/0155869 A1 Jun. 20, 2013

Related U.S. Application Data

(60) Provisional application No. 61/577,673, filed on Dec. 20, 2011.

(51) Int. Cl.
*H04L 12/28* (2006.01)
*H04W 72/04* (2009.01)
*H04L 5/00* (2006.01)
*H04J 1/16* (2006.01)

(52) U.S. Cl.
CPC .......... *H04W 72/042* (2013.01); *H04L 5/0053* (2013.01)

(58) Field of Classification Search
USPC .................. 370/252, 329, 278, 430
See application file for complete search history.

(56) References Cited

U.S. PATENT DOCUMENTS

| 9,008,035 B2* | 4/2015 | Qu ................. H04L 5/0016 370/330 |
| 2010/0118800 A1* | 5/2010 | Kim et al. .................. 370/329 |
| 2011/0194525 A1* | 8/2011 | Nishio et al. ............... 370/329 |
| 2011/0249633 A1* | 10/2011 | Hong et al. ................. 370/329 |
| 2012/0039285 A1* | 2/2012 | Seo et al. ................... 370/329 |
| 2013/0010741 A1* | 1/2013 | Dai et al. ................... 370/329 |
| 2013/0028108 A1* | 1/2013 | Wu et al. .................... 370/252 |
| 2013/0039291 A1* | 2/2013 | Blankenship et al. ...... 370/329 |
| 2013/0114525 A1* | 5/2013 | Ahmadi .............. H04L 5/0053 370/329 |
| 2013/0121304 A1* | 5/2013 | Nory ................. H04L 1/1861 370/330 |

OTHER PUBLICATIONS

LTE; Evolved Universal Terrestrial Radio Access (E-UTRA); Physical layer procedures (3GPP TS 36.213 version 10.2.0 Release 10), Technical Specification: ETSI TS 136 213 V10.2.0 (Jun. 2011), section 9.1.1.*

(Continued)

*Primary Examiner* — John Pezzlo
(74) *Attorney, Agent, or Firm* — Winston Hsu; Scott Margo

(57) ABSTRACT

A method of blind decoding of a control channel for a wireless communication system comprising a network and a mobile device is disclosed. The network selects at least one of a plurality of control channels of at least one logical domain of control channel element, for transmitting control information to the mobile device, wherein the plurality of control channels of each logical domain are uniformly distributed over the logical domain. On the other side, the mobile device monitors all of the control channel candidates of each of the at least one logical domain of control channel element, for obtaining the control information which is transmitted from the network and configured to the mobile device, wherein all of the control channel candidates of each logical domain are uniformly distributed over the logical domain.

14 Claims, 4 Drawing Sheets

(56) References Cited

OTHER PUBLICATIONS

European patent application No. 12008500.6, European application filing date: Dec. 20, 2012, European Search Report mailing date:Jun. 24, 2013.

LG-Ericsson, "Consideration on E-PDCCH multiplexing and signalling", 3GPP TSG RAN WG1 #66bis, R1-113372, Oct. 10-14, 2011, Zhuhai, China, XP050538429, pp. 1-3.

NEC Group, "Benefits of TDM-like structure for E-PDCCH control channel", TSG-RAN WG1 #67, R1-113872, Nov. 14-18t, 2011, San Francisco, USA, XP050562260, pp. 1-4.

NEC Group, "DL control channel enhancements for Rel-11", 3GPP TSG RAN WG1 Meeting#66, R1-112135, Aug. 22-26, 2011, Athens, Greece, XP050537307, pp. 1-8.

ETSI TS 136 213 V10.2.0 (Jun. 2011) Technical Specification LTE; Evolved Universal Terrestrial Radio Access (E-UTRA); Physical layer procedures (3GPP TS 36.213 version 10.2.0 Release 10).

Samsung, Search Space Design for DL Enhanced Control Channels, 3GPP TSG RAN WG1 #67 ; R1-114242, Nov. 14, 2011.

Qualcomm Incorporated, Search space design for e-PDCCH, 3GPP TSG RAN WG1 #67; R1-114125, Nov. 14, 2011.

* cited by examiner

METHOD OF BLIND DECODING OF CONTROL CHANNEL FOR A WIRELESS COMMUNICATION SYSTEM

CROSS REFERENCE TO RELATED APPLICATIONS

This application claims the benefit of U.S. Provisional Application No. 61/577,673 filed on Dec. 20, 2011 and entitled "Method and Apparatus for Blind Decoding Search Space Design of Enhanced Control Channel for OFDMA Systems", the contents of which are incorporated herein.

BACKGROUND OF THE INVENTION

1. Field of the Invention

The present invention relates to a method utilized in a wireless communication system, and more particularly, to a method of blind decoding of a control channel.

2. Description of the Prior Art

A long-term evolution (LTE) system, initiated by the third generation partnership project (3GPP), is now being regarded as a new radio interface and radio network architecture that provides a high data rate, low latency, packet optimization, and improved system capacity and coverage. In the LTE system, an evolved universal terrestrial radio access network (E-UTRAN) includes a plurality of evolved Node-Bs (eNBs) and communicates with a plurality of mobile stations, also referred as user equipments (UEs).

A long term evolution-advanced (LTE-A) system, as its name implies, is an evolution of the LTE system, considering relaying for cost-effective throughput enhancement and coverage extension. The LTE-A system includes all of the features of the LTE system and several new ones, the most important of which are: carrier aggregation, enhanced multi-antenna support, coordinated multiple point transmission and reception (CoMP), relaying and so on. The LTE system provides extensive support for deployment in spectrum allocations of various characteristics, with transmission bandwidths ranging from 1.4 MHz up to 20 MHz. In the LTE-A system, the transmission bandwidth can be further extended with carrier aggregation wherein multiple component carriers are aggregated and jointly used for transmission to/from a signal UE. In general, up to five component carriers can be aggregated, allowing for transmission bandwidth up to 100 MHz. In addition to wider bandwidth, LTE-A system is also expected to provide higher data rates and improved system performance. It will do this by further extending the support for multi-antenna transmission compared to the first release of LTE. For the downlink (DL), up to eight layers can be transmitted using an 8×8 antenna configuration. This allows for a peak spectral efficiency exceeding the requirement of 30 bits/s/Hz and implies a possibility for data rates beyond 1 Gbit/s in a 40 MHz bandwidth and even higher data rates with wider bandwidth.

LTE-A system also supports transmission and reception from multiple eNBs or transmission points and this technique is known as CoMP. CoMP can be used to enhance the transmission for cell edge UEs and also have better interference mitigation in system perspective.

For the correct operation of the wireless communication systems, only the data symbols transmitted in data channel is not enough. Downlink control information in downlink control channel (e.g. physical downlink control channel (PDCCH) in LTE and LTE-A systems) like DL grants which indicate the transmission formats (e.g. modulation format, channel coding rate, precoding matrix index, resource allocation, etc.) and UL grants which indicates the uplink parameters (e.g. modulation format, channel coding rate, precoding matrix index, resource allocation, etc.) are also necessary and should be transmitted in the control channel for a UE, in order to receive data channel and allocate uplink transmission in a right manner. For the cellular network, a base station needs to serve a lot of UEs. Therefore, the control channel transmitted by the base station contains multiple control information for different UEs. It is noted to make each mobile device know the position of its control information, lots of signaling may be needed. The control channel is usually blindly decoded and each UE has a UE-specific search space on the control channel to reduce the corresponding signaling.

A UE obtains control information dedicated to the UE through blind decoding PDCCHs, and all the PDCCHs the UE blindly decodes are PDCCH candidates in UE perspective. Nevertheless, during the blind decoding procedure, UEs suffer from decoding latency problem and may need to buffer a large number of symbols. Such additional complexity may generate a heavy burden for UEs. As a result, typically the number of total PDCCH candidates for each UE is a limited number. On the other hand, all PDCCH candidates for a certain UE in the UE-specific search space are contiguous among the control channel element (CCE) domain for simplicity.

As mentioned above, LTE-A system has several new features compared to conventional LTE system. The conventional PDCCH of LTE system works poorly with the addition of these new features. Therefore, enhanced PDCCH (EPDCCH) is introduced to have better cooperation with these new features.

An EPDCCH can be classified into two different types: localized transmission and distributed transmission. The design principle of distributed transmission is similar to legacy PDCCH. On the other hand, localized transmission aims at utilizing the MIMO beamforming gain and the frequency scheduling gain. The localized transmission of EPDCCH is placed localized on the time-frequency resources and is not interleaved. Yet, the channel frequency response may have poor gain among localized time-frequency resources. When constrained contiguous search space for EPDCCH is specified following a manner similar to that in conventional PDCCH, the base station may has a high probability that the base station can only schedule the EPDCCH among time-frequency resources with poor wireless channel gain and results in bad system performance.

SUMMARY OF THE INVENTION

It is therefore a primary objective of the present disclosure to provide a method of blind decoding of a control channel for a wireless communication system, to improve the system performance.

A method of blind decoding of a control channel for a wireless communication system comprising a network and a mobile device is disclosed. The network selects at least one of a plurality of control channels of at least one logical domain of control channel element, for transmitting control information to the mobile device, wherein the plurality of control channels of each logical domain are uniformly distributed over the logical domain. On the other side, the mobile device monitors all of the control channel candidates of each of the at least one logical domain of control channel element, for obtaining the control information which is transmitted from the network and configured to the mobile device, wherein all of the control channel candidates of each logical domain are uniformly distributed over the logical domain.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
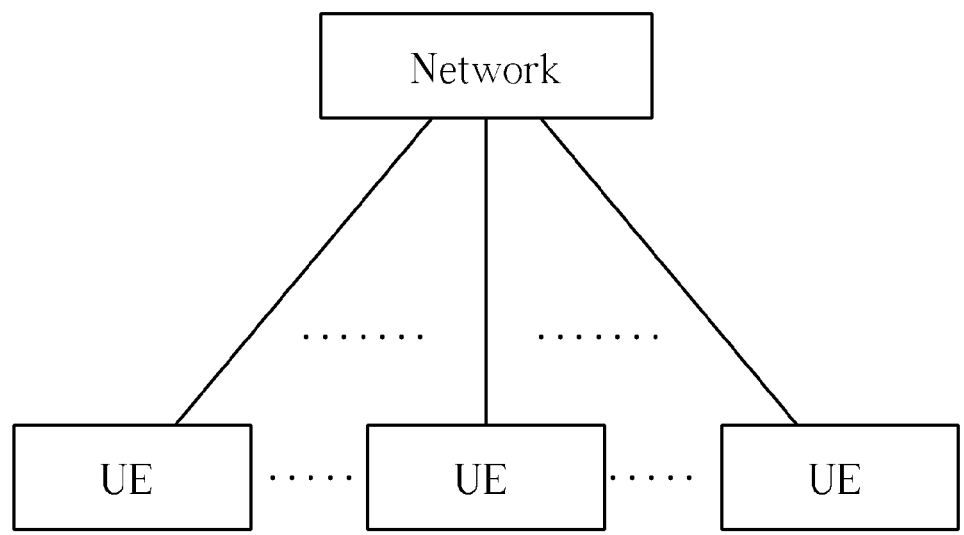
FIG. 1 is a schematic diagram of an exemplary wireless communication system.

Please refer to FIG. 1, which is a schematic diagram of an exemplary wireless communication system 10. The wireless communication system 10 can be an LTE-Advanced system, or other mobile communication systems (e.g. LTE, WCDMA, HSPA, GSM, EDGE, etc.). The wireless communication system 10 is briefly composed of a network and a plurality of user equipments (UEs), as the structure illustrated in FIG. 1. In the LTE-Advanced system, the network is referred as an evolved universal terrestrial radio access network (E-UTRAN) comprising a plurality of evolved base stations (eNBs). The UEs can be devices such as mobile phones, computer systems, etc. Besides, the network and the UE can be seen as a transmitter or receiver according to transmission direction, e.g., for uplink (UL), the UE is the transmitter and the network is the receiver, and for downlink (DL), the network is the transmitter and the UE is the receiver.

Figure 2:
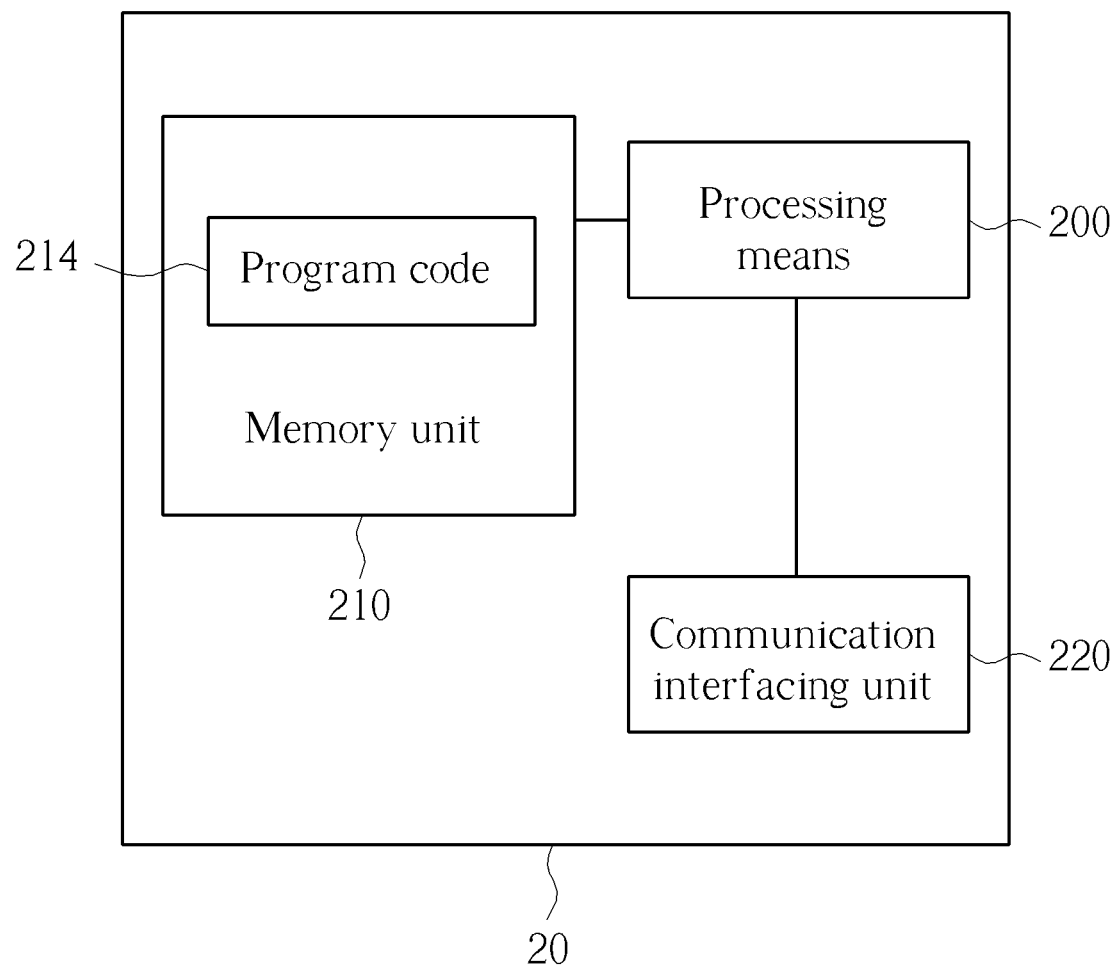
FIG. 2 is a schematic diagram of an exemplary communication device 20

Please refer to FIG. 2, which is a schematic diagram of an exemplary communication device 20. The communication device 20 can be the UE or the network shown in FIG. 1 and may include a processing means 200 such as a microprocessor or ASIC, a memory unit 210, and a communication interfacing unit 220. The memory unit 210 may be any data storage device that can store program code 214 for access by the processing means 200. Examples of the memory unit 210 include but are not limited to a subscriber identity module (SIM), read-only memory (ROM), random-access memory (RAM), CD-ROMs, magnetic tapes, floppy disks, and optical data storage devices. The communication interfacing unit 220 is preferably a radio transceiver for wirelessly communicating with the network according to processing results of the processing means 200.

Figure 3:
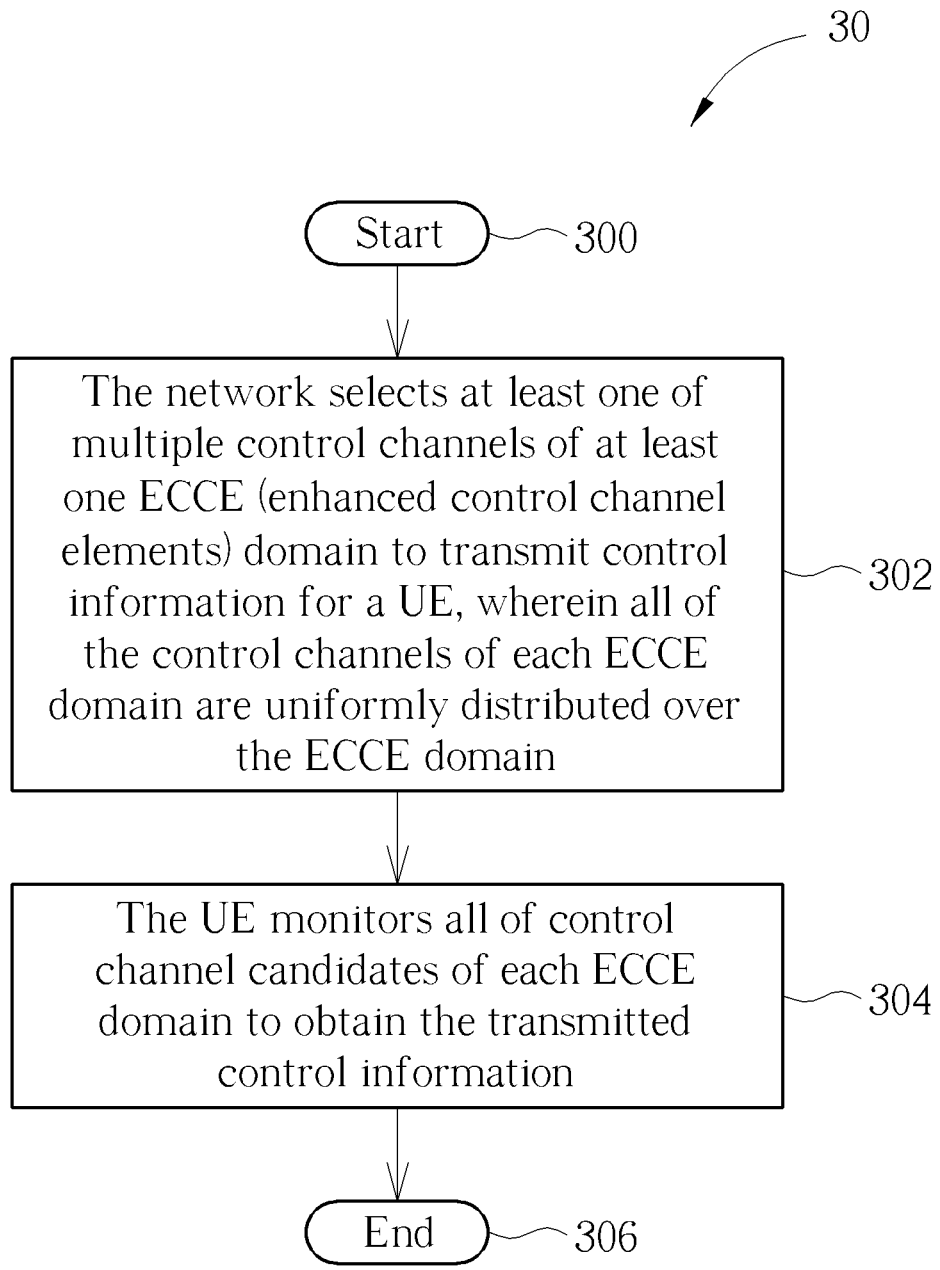
FIG. 3 is a flow chart of an exemplary process.

In wireless communication system 10, Orthogonal Frequency-Division Multiple Access (OFDMA) may be selected for downlink for multi-carrier technology to provide a very flexible multiple access scheme. The OFDMA enables the downlink signal to be subdivided into small units of time and frequency. For the wireless communication system using downlink OFDM system, control channels are usually blindly decoded by each UE to avoid signaling complexity. Please refer to FIG. 3, which is a flowchart of a process 30 according to an example of the present disclosure. The process 30 is used for blind decoding of an enhanced control channel for the wireless communication system 10. Preferably, the enhanced control channel utilizes MIMO beamforming techniques and may be benefitted by frequency scheduling gain. The process 30 can be compiled into the program code 214 and includes the following steps:

Step 300: Start.

Step 302: The network selects at least one of multiple control channels of at least one ECCE (enhanced control channel elements) domain to transmit control information for a UE, wherein all of the control channels of each ECCE domain are uniformly distributed over the ECCE domain.

Step 304: The UE monitors all of control channel candidates of each ECCE domain to obtain the transmitted control information.

Step 306: End.

According to the process 30, the network selects at least one of multiple control channels of at least one ECCE domain to transmit the control information. Please note that, all of the multiple control channels of each configured ECCE domain (that the network may select from) are uniformly distributed over each ECCE domain, thus in UE perspective, the multiple control channels of a configured ECCE domain are regarded as a set of control channel candidates, i.e. EPDCCH candidates. Please note that, an ECCE domain is a logical domain in view of enhanced control channel element (ECCE), and it is not a physical domain as time domain or frequency domain. One ECCE consists of several enhanced resource element groups (EREGs).

The total number of ECCE domains for a UE can be one or more than one, and ECCE domains are configured by higher layer signaling, e.g. Radio Resource Control (RRC) signaling. For example, for a UE configured with two ECCE domains, the relationship between ECCE domain and time-frequency domain may be: ECCE domain #1 consists of physical resource blocks (RBs) numbered 1, 4, 8 and 10, and ECCE domain #2 consists of physical RBs numbered 2, 5, 7, and 9. In addition, Step 302 is presented in view of transmitting one control information, and if the network intends to transmit more than one control information, such as transmitting both UL grant and DL grant, Step 302 is also applied in the same way. Preferably, the control information is downlink control information including modulation format, channel coding rate, precoding matrix index, resource allocation, etc.

As mentioned previously, the multiple control channels of a configured ECCE domain are, in UE perspective, as a set of control channel candidates, i.e. EPDCCH candidates. Each of the control channel candidates may occupy one or more ECCEs in the configured ECCE domain. The UE monitors all the control channel candidates on each ECCE domain to obtain the transmitted control information, where the UE monitoring implies the UE attempting to decode each of the control channel candidates (i.e. EPDCCH candidates). Since the all control channel candidates of each ECCE domain are uniformly distributed over each ECCE domain, the candidates are more likely to be placed on the position where the EPDCCH channel frequency response has a better wireless channel gain and frequency scheduling gain can be achieved. Then UE monitors all the control channel candidates of all ECCE domains to obtain the transmitted control information.

In examples of the present disclosure, the network may select a control channel, which has a better scheduling gain of the EPDCCH channel response than other control channels, to transmit the control information. As a result, the present disclosure can improve the system performance.

Figure 4:
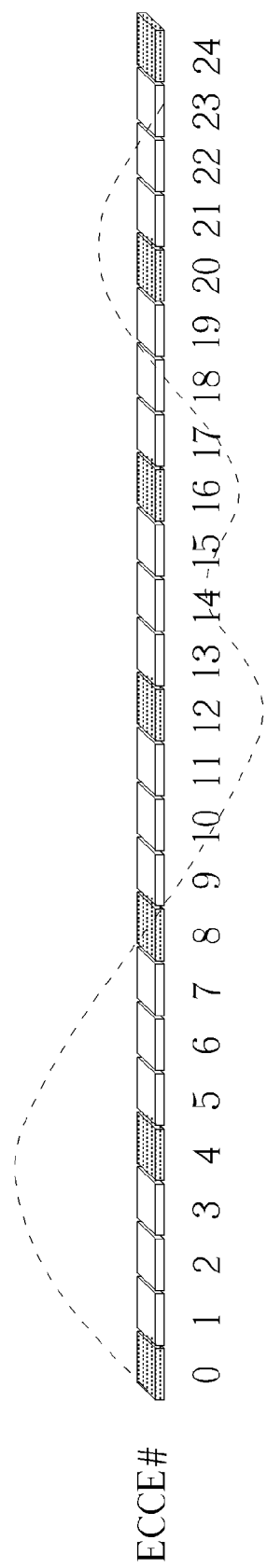
FIG. 4 illustrates an example of candidates uniformly distributed on a logical domain.

Please refer to FIG. 4, which illustrates that EPDCCH candidates are uniformly distributed over the ECCE domain according to an example of the present disclosure. As seen in FIG. 4, the EPDCCH candidates #: 1, 2, 2, 3, . . . , n are uniformly distributed on one ECCE domain, and the dashline curve represents the wireless channel response on the ECCE domain. The EPDCCH candidate #4 has a better wireless channel gain than the other candidates. Thus, the network may select the EPDCCH candidate #4 to transmit the control information to achieve a better system performance and better frequency scheduling gain. It is noted that if the EPDCCH candidates #1, 2, 3, . . . , n are not uniformly distributed and are contiguous on the ECCE domain, it is possible that all EPDCCH candidates of the ECCE domain have bad wireless channel gain (e.g. ECCE 9~15) and the eNB is forced to transmit control information on a candidate with bad wireless channel gain. Therefore, the system performance is degraded.

Positions of the all control channel candidates over each ECCE domain is a function of an aggregation level, a total number of ECCEs, an index of the control channel candidate, and an ECCE-domain-specific pseudo-random number. The occupied ECCE position of the candidates can be obtained by an equation (1), as follows:

$$L\left\{\left(Y_k + \left\lfloor m * \frac{\lfloor N_{ECCE,k}/L \rfloor}{M^{(L)}} \right\rfloor\right) \mod \lfloor N_{ECCE,k}/L \rfloor\right\} + i \quad (1)$$

Where, the $N_{ECCE,k}$ is the total number of the ECCE in a configured ECCE domain of a subframe k; m=0, . . . , $M^{(L)}$ denotes the $m_{th}$ EPDCCH candidate, $M^{(L)}$ is the total number of the EPDCCH candidates; L is a corresponding aggregation level; i is from 0 to L−1 which denotes the $i_{th}$ occupied ECCE for the $m_{th}$ candidate; and $Y_k$ is an ECCE-domain-specific pseudo-random number which can be defined by a function of a configured ECCE-domain-specific parameter and a slot number within a radio frame. An example is to let $Y_k$ defined by an equation (2):

$$Y_k = (A \cdot Y_{k-1}) \bmod D \quad (2)$$

, where A=39827, D=65537, $$k = \left\lfloor \frac{n_s}{2} \right\rfloor,$$

where $n_s$ is the slot number within a radio frame. $Y_0$ is defined by a function of an ECCE-domain-specific parameter.

On the other hand, it is possible that $$m * \frac{\lfloor N_{ECCE,k}/L \rfloor}{M^{(L)}}$$

is not an integer and perfect uniformly distributed control channel candidates cannot be achieved. In this case, in practical implementation, it is natural to have sub-optimal uniformly distributed EPDCCH candidates and a floor function on $$m * \frac{\lfloor N_{ECCE,k}/L \rfloor}{M^{(L)}}$$

to make $$m * \frac{\lfloor N_{ECCE,k}/L \rfloor}{M^{(L)}}$$

an integer. In this way, the equation (1) can be represented by $$L\left\{\left(Y_k + \left\lfloor m * \frac{N_{ECCE,k}/L}{M^{(L)}} \right\rfloor\right) \mod \lfloor N_{ECCE,k}/L \rfloor\right\} + i$$

in mathematical form which have the same meaning as equation (1) when implemented by program or circuit.

According to the equation (1) above, the UE can calculate the positions of the control channel candidates to monitor, and further obtains the control information on the EPDCCH.

Furthermore, the aforementioned steps of the processes including suggested steps can be realized by means that could be a hardware, a firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include a system on chip (SOC), system in package (SiP), a computer on module (COM), and the communication device 20.

To sum up, for an OFDMA wireless communication system, the present disclosure discloses a new method of blind decoding, where all of the control channels of each ECCE domain, e.g. EPDCCHs, are uniformly distributed and thus the control channel candidates, e.g. EPDCCH candidates, are uniformly distributed over the ECCE domain. The network can select at least one of the EPDCCHs which have a better a frequency scheduling gain to transmit the control information according to the positions of all EPDCCH candidates derived by the equations. The UE can monitor all the EPDCCH candidates according to the examples of the present disclosure.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of blind decoding of a control channel for a mobile device of a wireless communication system comprising a network and the mobile device, the method comprising:
   monitoring all of enhanced physical downlink control channel (EPDCCH) candidates at an ECCE (enhanced control channel elements) domain,
   wherein the EPDCCH candidates are in a position derived from the following equation:

$$L\left\{\left(Y_k + \left\lfloor m * \frac{N_{ECCE,k}/L}{M^{(L)}} \right\rfloor\right) \mod \lfloor N_{ECCE,k}/L \rfloor\right\} + i,$$

where the $N_{ECCE,k}$ is the total number of ECCE in the ECCE domain of a subframe k; m denotes the $m^{th}$ EPDCCH candidate and m has a value range from 0 to $M^{(L)}$−1; $M^{(L)}$ is the total number of EPDCCH candidates of a corresponding aggregation level L for the ECCE domain; i denotes the index of ECCE of the $m^{th}$ EPDCCH candidate and i has a value range from 0 to L−1; and $Y_k$ is a pseudo-random number.

2. The method of claim 1, wherein the logical-domain-specific pseudo-random number $Y_k$ is defined by a function of a logical-domain-specific parameter and a slot number within a radio frame.

3. The method of claim 1, wherein the ECCE domain is not a physical domain defined by a time domain or a frequency domain.

4. The method of claim 3, wherein one ECCE comprises a plurality of EREGs (enhanced resource element groups).

5. The method of claim 4, wherein the mapping of the ECCEs to the EREGs is a localized transmission.

6. The method of claim 5, wherein the localized transmission of EPDCCH is not interleaved in the time domain and frequency domain.

7. The method of claim 1, wherein the ECCE domain is defined by an ECCE index.

8. A method of blind decoding of a control channel for a network of a wireless communication system comprising the network and a mobile device, the method comprising:
   selecting at least one enhanced physical downlink control channel (EPDCCH) candidate among all EPDCCH candidates at an ECCE (enhanced control channel elements) domain;
   mapping at least one EPDCCH to at least one EPDCCH candidate, wherein the at least one EPDCCH comprises control information to be transmitted to the mobile device,
   wherein the positions of all EPDCCH candidates are derived from the following equation:

$$L\left\{\left(Y_k + \left\lfloor m * \frac{N_{ECCE,k}/L}{M^{(L)}} \right\rfloor\right) \bmod \lfloor N_{ECCE,k}/L \rfloor \right\} + i,$$

where the $N_{ECCE,k}$ is the total number of ECCE in the ECCE domain of a subframe k; m denotes the $m^{th}$ EPDCCH candidate and m has a value range from 0 to $M^{(L)}-1$; $M^{(L)}$ is the total number of EPDCCH candidates of a corresponding aggregation level L for the ECCE domain; i denotes the index of ECCE of the $m^{th}$ EPDCCH candidate and i has a value range from 0 to L−1; and $Y_k$ is a pseudo-random number.

9. The method of claim 8, wherein the logical-domain-specific pseudo-random number $Y_k$ is defined by a function of a logical-domain-specific parameter and a slot number within a radio frame.

10. The method of claim 8, wherein the ECCE domain is not a physical domain defined by a time domain or a frequency domain.

11. The method of claim 8, wherein the ECCE domain is defined by an ECCE index.

12. The method of claim 8, wherein one ECCE comprises a plurality of EREGs (enhanced resource element groups).

13. The method of claim 12, wherein the mapping of the ECCEs to the EREGs is a localized transmission.

14. The method of claim 13, wherein the localized transmission of EPDCCH is not interleaved in the time domain and frequency domain.

* * * * *